United States Patent
Gloeckner et al.

(10) Patent No.: US 7,812,109 B2
(45) Date of Patent: *Oct. 12, 2010

(54) RESINS BASED ON KETONES AND ALDEHYDES, HAVING IMPROVED SOLUBILITY PROPERTIES AND LOW COLOR NUMBERS

(75) Inventors: Patrick Gloeckner, Haltern am See (DE); Bettina Burian, Dorsten (DE); Peter Denkinger, Nottuln (DE); Lutz Mindach, Bochum (DE); Franz-Josef Wesselbaum, Marl (DE)

(73) Assignee: Evonik Degussa GmbH, Essen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 12/342,612

(22) Filed: Dec. 23, 2008

(65) Prior Publication Data

US 2009/0105442 A1    Apr. 23, 2009

Related U.S. Application Data

(62) Division of application No. 10/863,369, filed on Jun. 9, 2004, now abandoned.

(30) Foreign Application Priority Data

Jun. 14, 2003    (DE) ................ 103 26 893

(51) Int. Cl.
*C08G 12/04*    (2006.01)
*C08G 6/02*    (2006.01)
*C09D 161/00*    (2006.01)
*C09J 161/00*    (2006.01)

(52) U.S. Cl. ............... 528/222; 528/224; 528/227; 528/125; 528/126

(58) Field of Classification Search ........... 528/222, 528/224, 227, 125, 126
See application file for complete search history.

(56) References Cited

U.S. PATENT DOCUMENTS

| | | |
|---|---|---|
| 3,625,918 A | 12/1971 | Heer et al. |
| 3,926,636 A | 12/1975 | Barzynski et al. |
| 4,083,816 A | 4/1978 | Frankel et al. |
| 4,731,434 A | 3/1988 | Doerffel |
| 5,705,597 A | 1/1998 | Oortelt et al. |
| 6,552,154 B1 | 4/2003 | Kohlstruk et al. |
| 6,730,628 B2 | 5/2004 | Kohlstruk et al. |
| 6,794,482 B2 | 9/2004 | Gloeckner et al. |
| 6,797,787 B2 | 9/2004 | Scholz et al. |
| 6,800,714 B2 | 10/2004 | Kohlstruk et al. |
| 6,881,785 B2 | 4/2005 | Glockner et al. |
| 7,005,002 B2 | 2/2006 | Glockner et al. |
| 7,033,522 B2 | 4/2006 | Jonderko et al. |
| 7,101,958 B2 * | 9/2006 | Gloeckner et al. .......... 528/222 |
| 7,135,522 B2 | 11/2006 | Gloeckner et al. |
| 7,138,465 B2 | 11/2006 | Glockner et al. |
| 7,144,975 B2 | 12/2006 | Glockner et al. |
| 7,183,372 B2 | 2/2007 | Andrejewski et al. |
| 7,199,166 B2 | 4/2007 | Gloeckner et al. |
| 7,329,710 B2 | 2/2008 | Glockner et al. |
| 2004/0122172 A1 | 6/2004 | Glockner et al. |
| 2005/0043499 A1 | 2/2005 | Glockner et al. |
| 2006/0074217 A1 | 4/2006 | Glockner et al. |
| 2007/0123661 A1 | 5/2007 | Glockner et al. |
| 2008/0027156 A1 | 1/2008 | Gloeckner et al. |

FOREIGN PATENT DOCUMENTS

| | | |
|---|---|---|
| CA | 2252290 | 5/1999 |
| DE | 24 10 863 | 9/1975 |
| EP | 0 007 106 | 1/1980 |
| EP | 0 668 301 A1 | 8/1995 |
| JP | 50-028986 | 9/1975 |

OTHER PUBLICATIONS

Hummerich, CAPLUS AN 1980:181897, abstracting EP7106.
Abo, CAPLUS AN 1976:91810, abstracting JP 50-028896.
Abo, et al., translation of JP 50-028986 (Sep. 1975).

* cited by examiner

*Primary Examiner*—Jeffrey C Mullis
(74) *Attorney, Agent, or Firm*—Oblon, Spivak, McClelland, Maier & Neustadt, L.L.P.

(57) ABSTRACT

A resin is based on ketones and aldehydes and is prepared in methanol or ethanol in the presence of a phase transfer catalyst. The resin features a very broad solubility and low intrinsic color.

34 Claims, No Drawings

RESINS BASED ON KETONES AND ALDEHYDES, HAVING IMPROVED SOLUBILITY PROPERTIES AND LOW COLOR NUMBERS

This is a divisional application of U.S. application Ser. No. 10/863,369, filed Jun. 9, 2004.

BACKGROUND OF THE INVENTION

1. Field of the Invention

The invention relates to ketone-aldehyde resins having very broad solubility properties and low color numbers, to a process for preparing them, and to their use as principal component, base component or addition component in coating compositions, printing inks, pigment pastes, tinting pastes, ballpoint pastes, graphics inks, polishes, adhesives, sealants, and insulating materials.

2. Description of the Related Art

EP 0 668 301 (U.S. Pat. No. 5,705,597) describes the preparation of ketone-aldehyde resins. According to the process described therein, products of this kind possess relatively high color numbers. The use of phase transfer catalysts is not described.

U.S. Pat. No. 4,731,434 describes the use of phase transfer catalysts for the preparation of resins from alkyl aryl ketones, whose solubility profile does not extend to the broad solubility profile of the products addressed by the invention.

EP 0 007 106 describes polycondensation products of aliphatic and cyclic ketones, which, prepared by the process disclosed therein, have very high softening ranges and, consequently, comparatively high molar weights. The resins are not soluble in aliphatic solvents. The phase transfer catalysts employed therein have no aromatic radicals.

SUMMARY OF THE INVENTION

Accordingly, it is an object of the present invention to prepare resins having both low intrinsic coloring with broad solubility in a very wide variety of solvents and broad compatibility with other paint base materials.

It has surprisingly been possible to achieve this object, as described in the claims, through the use of a phase transfer catalyst during the preparation of the resins from the monomers described in more detail below. Resins based on cycloaliphatic ketones and on aliphatic and/or aromatic aldehydes are prepared.

The ketone-aldehyde resins of the invention are soluble in virtually all organic solvents useful for coatings, including, in particular, mineral oils, white spirits, and aliphatics. They are likewise soluble in alcoholic solvents such as ethanol. This affords the possibility of formulating low-odor, environmentally unburdensome coating materials which are toxicologically unobjectionable.

The ketone-aldehyde resins of the invention exhibit broad compatibility with binders and resins. In particular they can be mixed even with relatively nonpolar binders and/or resins such as long-chain alkyd resins, natural oils, and hydrocarbon resins, but also with polar binders and/or resins, such as polyesters, polyamides, polyacrylates, nitrocellulose, etc.

Consequently they are especially useful as a principal, base or addition component in coating compositions, printing inks, pigment pastes, tinting pastes, ballpoint pastes, graphics inks, polishes, adhesives, sealants, and insulating materials.

From the ketone-aldehyde resins of the invention it is possible to formulate stable pigment preparations and tinting pastes which by virtue of their broad compatibility can be used in the majority of coating materials, resulting in outstanding coloristic properties.

They can likewise be used in order, for example, to enhance hardness, gloss and leveling of coating materials, printing inks, pigment pastes, tinting pastes, ballpoint pastes, graphics inks, and polishes. In the light of their viscosity behavior the resins relevant to the invention are able to increase the solids fraction of such products, thereby allowing the fraction of organic solvents to be reduced.

DETAILED DESCRIPTION OF THE INVENTION

The ketone-aldehyde resins of the invention may comprise, individually or as a mixture, cyclohexanone and any alkyl-substituted cyclohexanones having one or more alkyl radicals containing a total of 1 to 8 carbon atoms. Examples include 4-tert-amylcyclohexanone, 2-sec-butylcyclohexanone, 2-tert-butylcyclohexanone, 4-tert-butylcyclohexanone, 2-methylcyclohexanone, and 3,3,5-trimethylcyclohexanone. Preference is given to cyclohexanone, 4-tert-butylcyclohexanone, and 3,3,5-trimethylcyclohexanone.

Suitable aliphatic aldehydes include branched and unbranched aldehydes, such as formaldehyde, acetaldehyde, n-butyraldehyde and/or isobutyraldehyde, for example, and also dodecanal, etc.; preference, however, is given to using formaldehyde, alone or as a mixture.

The formaldehyde needed is normally used in the form of an aqueous solution with an approximate concentration of from 25 to 40% by weight. Other forms of formaldehyde are likewise possible, including, for example, para-formaldehyde or trioxane. Aromatic aldehydes, such as benzaldehyde, may likewise be present as a mixture with formaldehyde.

Further monomers that may be present in the ketone-aldehyde resins of the invention include, primarily, ketones, alone or in a mixture. These ketones may possess an aliphatic, cycloaliphatic, aromatic or mixed character. Examples include acetone, acetophenone, methyl ethyl ketone, 2-heptanone, 3-pentanone, methyl isobutyl ketone, cyclopentanone, pinacolone, cyclododecanone, mixtures of 2,2,4 and 2,4,4-trimethylcyclopentanone, cycloheptanone, and cyclooctanone. Preference, however, is given to methyl ethyl ketone and acetophenone. Generally speaking, it is possible to use any of the ketones said in the literature to be suitable for ketone resin syntheses. As a general rule any C—H-acidic ketones may be used.

In minor amounts it is also possible, where appropriate, for further monomers, such as phenols, urea and its derivatives, to be present as additional monomers in the ketone-aldehyde resins of the invention.

One embodiment of the invention comprises mixtures of cyclohexanones. Particular practical significance is accorded to mixtures of trimethylcyclohexanone/cyclohexanone, 4-tert-butylcyclohexanone/trimethylcyclohexanone/cyclohexanone, and 4-tert-butylcyclo-hexanone/trimethylcyclohexanone, in molar ratios of the substituted cyclohexanone to the unsubstituted cyclohexanone of from 0.1:0.9 to 0.9:0.1, preferably from 0.2:0.8 to 0.8:0.2, more preferably from 0.3:0.7 to 0.7:0.3.

The ratio between the ketone component and the aldehyde component can vary from 1:0.9 to 1:4. Preference, however, is given to a ketone/aldehyde ratio of from 1:1 to 1:2.

By varying the proportions it is easy to adjust resin properties such as melting range, hydroxyl number, and molecular weight for the skilled worker. Reaction takes place in an auxiliary solvent. Methanol and ethanol have each proven suitable. It is also possible, however, to use auxiliary solvents which can likewise be converted during the reaction. One example of such is methyl ethyl ketone.

At from 0.01 to 15% by mass, based on the ketone, a phase transfer catalyst of the general formula (A)

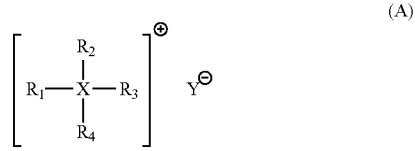

(A)

is used in the polycondensation mixture, where
X is a nitrogen atom or phosphorus atom,
$R_1$ is a phenyl radical or benzyl radical,
$R_2$, $R_3$, and $R_4$ can be identical or different and are each an alkyl radical having 1 to 22 carbon atoms in the carbon chain and/or a phenyl radical and/or a benzyl radical, and
Y is the anion of an (in)organic acid or a hydroxide ion.

When the phase transfer catalyst is a quaternary ammonium salt, alkyl radicals ($R_{2-4}$) having 1 to 22 carbon atoms, especially those having 1 to 12 carbon atoms, in the carbon chain and/or phenyl radicals and/or benzyl radicals and/or mixtures of both are preferred. For quaternary phosphonium salts, alkyl radicals having 1 to 22 carbon atoms and/or phenyl radicals and/or benzyl radicals are preferred for $R_{2-4}$.

Suitable anions include those of strong (in)organic acids, such as $Cl^-$, $Br^-$, or $I^-$, for example, and also hydroxides, methoxides or acetates.

Examples of quaternary ammonium salts include cetyldimethylbenzylammonium chloride, tributylbenzylammonium chloride, trimethylbenzylammonium chloride, trimethylbenzylammonium iodide, triethylbenzylammonium chloride, and triethylbenzylammonium iodide. Examples of suitable quaternary phosphonium salts include triphenylbenzylphosphonium chloride and triphenylbenzylphosphonium iodide. Mixtures, however, can also be used.

The phase transfer catalyst of the invention is used in amounts of from 0.01 to 15%, preferably from 0.1 to 10.0%, and in particular in amounts of from 0.1 to 5.0% by mass, based on the ketone used, in the polycondensation mixture.

Besides the phase transfer catalyst, strongly basic compounds such as alkali metal hydroxides, especially NaOH and/or KOH, are used as catalysts for the polycondensation.

The basic catalysts are used in amounts of >0.1 mol %, preferably >1 mol %, and in particular in amounts of >5 mol %, based on the ketone, in the reaction mixture.

All known methods of resin synthesis can be employed. Normally condensation is conducted in the presence of alkaline catalysts at temperatures from 75 to 95° C. Reactions of this kind are described in, for example, Ullmann's Encyclopädie der technischen Chemie, Vol. 12, Verlag Chemie Weinheim, 1976, pages 547 to 555 (incorporated herein by reference).

Depending on the ratio of ketone to aldehyde, the ketone-aldehyde resins relevant to the invention possess
  melting ranges of from 30 to 150° C., preferably from 40 to 100° C., more preferably from 50 to 90° C.,
  average molecular weights of from 400 to 2000, more preferably from 500 to 1000,
  color numbers (Gardner, 50% in ethyl acetate) of less than 4, preferably less than 2, more preferably less than 1.5, and
  OH numbers of from 0 to 200 mg KOH/g, preferably from 0 to 150, more preferably from 0 to 100.

The resins to which the invention relates are each completely soluble to give a clear solution, as a 10% concentration and 50% concentration solution of ethanol and white spirit.

EXAMPLES

The invention is illustrated with reference to the following non-limiting examples.

Preparation of ketone-aldehyde resins of low color number:

A mixed resin is prepared from trimethylcyclohexanone and cyclohexanone and also formaldehyde under the conditions described in EP 0 668 301 (incorporated herein by reference in its entirety) in the absence of a phase transfer catalyst (GL 269, 270, 271, 294 see Table 1 below).

The molar amounts and the properties of the resins obtained are shown in Table 1. In this regime, color numbers of around 4 are usual. The other analytical values for the resins obtained serve as target parameters.

Starting from the standard operating procedure, methanol was used as auxiliary solvent. Additionally, tributylbenzylammonium chloride was used as phase transfer catalyst.

TABLE 1

| GL | TMCone/CH [mol] | NaOH [mol] | PTC [%] | MeOH [ml/mol ketone] | HCHO [mol] | SP [° C.] | CN | NVC [%] (5/24 h 150° C.) | Solubility (10% in WS/EtOH) |
|---|---|---|---|---|---|---|---|---|---|
| 269 | 0.574/0.426 | 0.1 | — | 125 ml EtOH | 1.4 | 57 | 4.5 | 82.7/76.8 | ++/++ |
| 270 | 0.574/0.426 | 0.1 | — | 125 ml EtOH | 1.4 | 59 | 3.9 | 84.4/78.8 | ++/++ |
| 271 | 0.574/0.426 | 0.1 | — | 125 ml EtOH | 1.4 | 58 | 4.3 | 89.3/84.1 | ++/++ |
| 294 | 0.574/0.426 | 0.1 | — | 125 ml EtOH | 1.4 | 56 | 4.0 | 88.9/83.7 | ++/++ |
| 220 | 0.574/0.426 | 0.1 | 0.3 | 150 | 1.4 | 54 | 1.4 | 83.5/76.6 | ++/++ |
| 221 | 0.574/0.426 | 0.1 | 1.0 | 150 | 1.4 | 55 | 1.0 | 86.2/80.5 | ++/++ |
| 229 | 0.574/0.426 | 0.11 | 0.3 | 150 | 1.4 | 56 | 0.8 | 83.6/77.6 | ++/++ |
| 230 | 0.574/0.426 | 0.115 | 0.3 | 150 | 1.4 | 58 | 1.4 | 78.3/73.4 | ++/++ |
| 231 | 0.574/0.426 | 0.125 | 0.3 | 150 | 1.4 | 60 | 1.1 | 81.7/75.9 | ++/++ |
| 254 | 0.574/0.426 | 0.125 | 0.3 | 150 | 1.4 | 60 | 1.0 | 82.1/76.4 | ++/++ |

A notable point in addition to the very much lower color number of the product was the very effective phase separation, which allowed the number of washes to be reduced from seven to five. The other properties, such as compatibilities with other base materials, and pigment wetting properties of the resins prepared using a phase transfer catalyst, are identical with those of the comparative products described in EP 0 668 301.

Abbreviations
CH cyclohexanone
EtOH ethanol
SP softening point (DIN 53 181)
MeOH methanol
NVC nonvolatiles content
PTC phase transfer catalyst
WS white spirit
TBBACl tributylbenzylammonium chloride
TMCone trimethylcyclohexanone
CN Gardner color number (50% in ethyl acetate)

German application 10326893.6 filed on Jun. 14, 2003 is incorporated herein by reference in its entirety.

Obviously, numerous modifications and variations of the present invention are possible in light of the above teachings. It is therefore to be understood that within the scope of the appended claims, the invention may be practiced otherwise than as specifically described herein.

The invention claimed is:

1. A process for preparing a resin comprising reacted units of one or more (cyclo)aliphatic ketones and at least one of an aliphatic or aromatic aldehyde, which process comprises reacting the ketone and the aldehyde in methanol or ethanol as auxiliary solvent in the presence of a phase transfer catalyst of general formula (A)

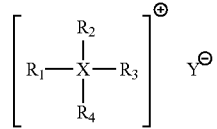

(A)

where
X is a nitrogen atom or phosphorus atom,
$R_1$ is a phenyl radical or benzyl radical,
$R_2$, $R_3$, and $R_4$ are identical or different and are each an alkyl radical having 1 to 22 carbon atoms in the carbon chain, a phenyl radical, or a benzyl radical, and
Y is the anion of an organic acid, inorganic acid or a hydroxide ion,
wherein the resin is soluble in ethanol and white spirits, and intrinsically has a Gardner color number of less than 4 measured in a 50% solution in ethyl acetate.

2. The process as claimed in claim 1, wherein the phase transfer catalyst is present in an amount of from 0.01 to 15% by mass based on the total weight of the ketone.

3. The process as claimed in claim 1, wherein the phase transfer catalyst is present in an amount of from 0.1 to 10% by mass based on the total weight of the ketone.

4. The process as claimed in claim 1, wherein the phase transfer catalyst is present in an amount of from 0.1 to 5% by mass based on the total weight of the ketone.

5. The process as claimed in claim 1, wherein the phase transfer catalyst is at least one selected from the group consisting of cetyldimethylbenzylammonium chloride, tributylbenzylammonium chloride, trimethylbenzylammonium chloride, trimethylbenzylammonium iodide, triethylbenzylammonium chloride, triethylbenzylammonium iodide, triphenylbenzylphosphonium chloride, triphenylbenzylphosphonium iodide and a mixture thereof.

6. The process as claimed in claim 1, wherein the resin comprises reacted units of cyclohexanone and at least one alkyl-substituted cyclohexanone having one or more $C_1$-$C_8$ alkyl radicals.

7. The process as claimed in claim 1, wherein the resin comprises reacted units of at least one selected from the group consisting of 4-tert-amylcyclohexanone, 2-sec-butylcyclohexanone, 2-tert-butylcyclohexanone, 4-tert-butylcyclohexanone, 2-methylcyclohexanone, and 3,3,5-trimethylcyclohexanone, and cyclohexanone.

8. The process as claimed in claim 1, wherein the resin comprises reacted units of cyclohexanone, 4-tert-butylcyclohexanone, and 3,3,5-trimethylcyclohexanone.

9. The process as claimed in claim 7, wherein the resin further comprises reacted units of one or more ketones selected from the group consisting of acetone, acetophenone, methyl ethyl ketone, 2-heptanone, 3-pentanone, methyl isobutyl ketone, cyclopentanone, picacolone, cyclododecanone, a mixture of 2,2,4- and 2,4,4-trimethylcyclopentanone, cycloheptanone, and cyclooctanone.

10. The process as claimed in claim 1, wherein the resin comprises reacted units of one or more branched or unbranched aldehyde.

11. The process as claimed in claim 1, wherein the aldehyde is selected from the group consisting of formaldehyde, acetaldehyde, n-butyraldehyde, iso-butyraldehyde, dodecanal and benzaldehyde.

12. The process as claimed in claim 1, wherein the resin comprises reacted units of at least formaldehyde.

13. The process as claimed in claim 1, wherein the resin comprises reacted units of one or more further monomers in a minor amount.

14. The process as claimed in claim 13, wherein the further monomer is at least one selected from the group consisting of phenol, urea and derivatives thereof.

15. The process as claimed in claim 1, wherein the resin comprises reacted units of substituted and unsubstituted cyclohexanone in a molar ratio of from 0.1:0.9 to 0.9:0.1.

16. The process as claimed in claim 1, wherein the resin comprises reacted units of substituted and unsubstituted cyclohexanone in a molar ratio from 0.2:0.8 to 0.8:0.2.

17. The process as claimed in claim 1, wherein the resin comprises reacted units of substituted and unsubstituted cyclohexanone in a molar ratio from 0.3:0.7 to 0.7:0.3.

18. The process as claimed in claim 1, wherein a ratio between the ketone component and the aldehyde component is from 1:0.9 to 1:4.

19. The process as claimed in claim 1, wherein a ratio between the ketone component and the aldehyde component is from 1:1 to 1:2.

20. The process as claimed in claim 1, wherein the resin has a Gardner color number of less than 2.

21. The process as claimed in claim 1, wherein the resin has a Gardner color number of less than 1.5.

22. The process as claimed in claim 1, wherein the resin has a melting range between 30 and 150° C.

23. The process as claimed in claim 1, wherein the resin has a melting range between 40 and 100° C.

24. The process as claimed in claim 1, wherein the resin has a melting range between 50 and 100° C.

25. The process as claimed in claim 1, wherein the resin has an OH number of from 0 to 200 mg KOH/g.

26. The process as claimed in claim 1, wherein the resin has an OH number of from 0 to 150 mg KOH/g.

27. The process as claimed in claim 1, wherein the resin has an OH number of from 0 to 100 mg KOH/g.

28. The process as claimed in claim 1, wherein the resin is completely soluble as a 10% strength or 50% strength by weight solution in ethanol and white spirit to give a clear solution.

29. The process as claimed in claim 1, wherein the ketone is trimethylcyclohexanone and cyclohexanone, the aldehyde is formaldehyde, reacted in methanol, and wherein the resin has a Gardner color number of 2.0 or less measured in a 50% solution in ethyl acetate.

30. The process as claimed in claim 29, wherein the Gardner color number is 1.4 or less.

31. The process as claimed in claim 1, wherein the Gardner color number of the resin is lower by at least 2.6 Gardner color units in comparison to the Gardner color number of a resin containing the same ketone and the same aldehyde units reacted in the absence of a phase transfer catalyst.

32. The process as claimed in claim 1, wherein the resin consists of reacted units of trimethylcyclohexanone, cyclohexanone and formaldehyde.

33. The process as claimed in claim 1, wherein the phase transfer catalyst is at least one selected from the group consisting of triphenylbenzylphosphonium chloride and triphenylbenzylphosphonium iodide.

34. The process as claimed in claim 7, wherein the resin further comprises reacted units of one or more ketones selected from the group consisting of a mixture of 2,2,4- and 2,4,4-trimethylcyclopentanone, cycloheptanone, and cyclooctanone.

* * * * *